United States Patent Office 2,755,784
Patented July 24, 1956

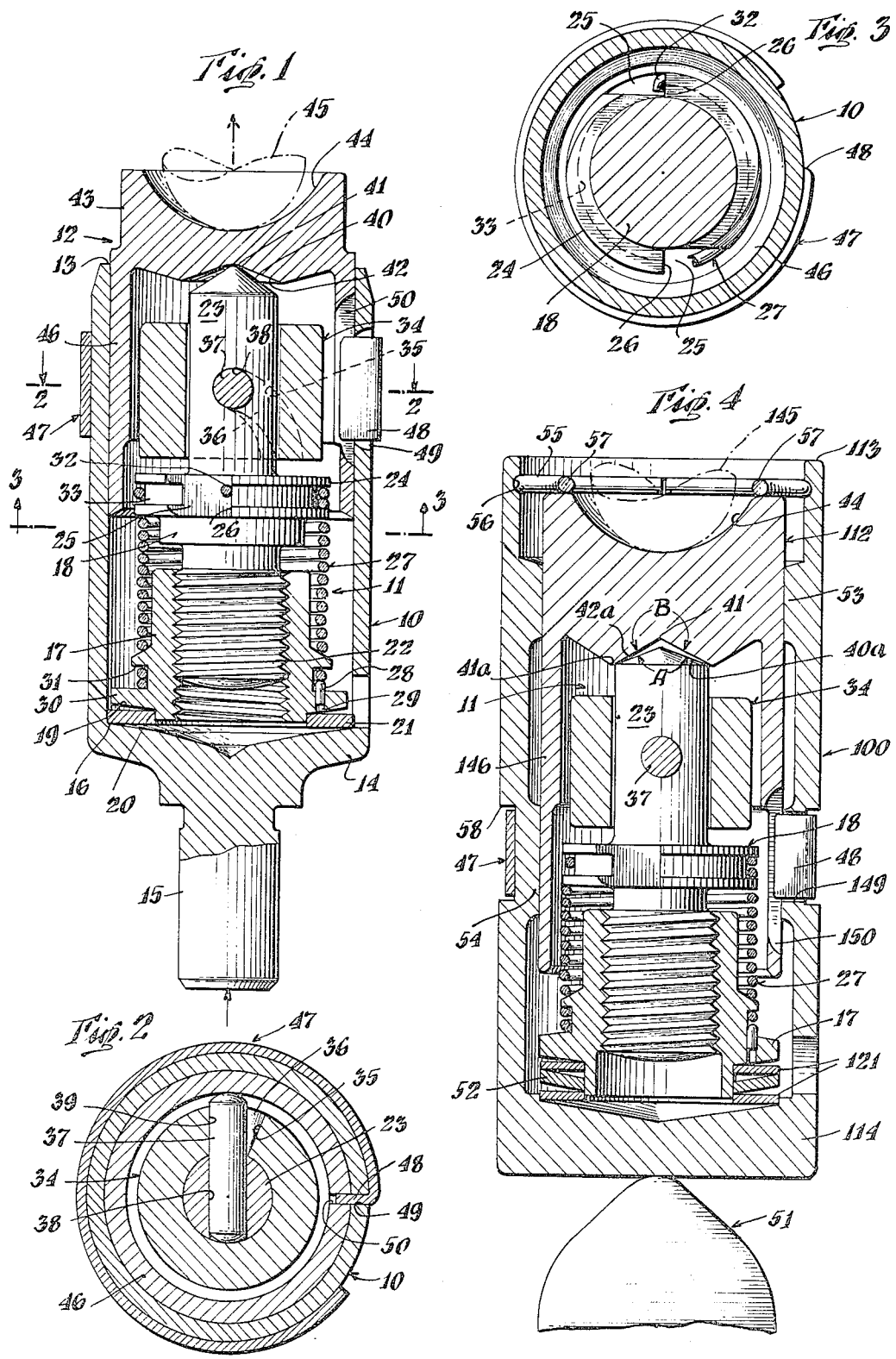

2,755,784
LENGTH COMPENSATING DEVICES

Bronson C. Skinner, Dunedin, Fla., assignor to Brunhilde W. Skinner, Dunedin, Fla.

Application March 10, 1955, Serial No. 493,533

14 Claims. (Cl. 123—90)

The present invention relates to mechanical length compensating means particularly useful in thrust transmitting linkages such as valve operating linkages, either as tappets at points adjacent the normal rotary cams or at other points in the linkages of elements between other cam tappets and valve stems of internal combustion engines, and embodiments thereof may be generally identified as automatically-adjustable mechanical clearance governing or maintaining devices.

Such devices are characterized by a hollow body or housing in which is mounted a sub-assembly comprising a cooperating pair of threadably interfitted members with one abutting the body or housing and the other serving as an extendable and retractable thrust member. Torsional spring means tie the members together to urge the thrust member toward threadable retraction relative to the other member to increase the effective length of the sub-assembly. An inertia hammer is mounted in the sub-assembly for axial motion and has a helical surface engageable of a member-advancing abutment first to spin the hammer when the device is brought to a stop, the spinning hammer having an abutment which then strikes the advancing abutment torsionally to drive one of the members threadably to advance it relative to the other member in opposition to the urging of the resilient means and thus to shorten the effective length of the sub-assembly.

Prior to the present invention rotation of such devices in operation has been common and frequently intentional. Such rotation when imparted to the body or housing thereof has developed problems with respect to proper effective lengthening and shortening action of the sub-assembly, particularly where appreciable drag is imparted to one member of the latter by linkage elements against which it acts.

It is a general object of the present invention efficiently to solve such problems, the devices of the present invention effectively isolating the sub-assemblies thereof so that the effects of rotary action against linkage elements to which thrust is applied thereby are desirably minimized or eliminated, and to provide practical embodiments which assure other advantages in manufacturing and use.

A more specific object of the invention is to provide such automatically-adjustable mechanical clearance governing or maintaining devices which interpose between the length-adjusting hammer-equipped sub-assemblies thereof and linkage elements to which they apply thrust certain unique thrust transfer means having minimum drag-imposing contact with such sub-assemblies and keyed for rotation with housing structures of the devices.

Another object of the invention is to provide such a device in a form in which the housing and the interposed thrust transfer means cooperatively form an enclosing casing with the parts thereof being capable of being telescoped relative to each other to permit the length adjustment of the enclosed sub-assembly, the parts being effectively keyed together for simultaneous rotation.

A further object of the invention is to provide in such a device the interposed thrust transfer means in a form assuring maintenance of coaxiality when moved toward and away from the housing during shortening and lengthening action of the device, proper seating of other linkage elements thereagainst at all times thus being assured.

Still another object of the invention is to provide structural embodiments which are readily and economically constructed and assembled and which permit efficient use and operation thereof.

Other objects of the invention will in part be obvious and will in part appear hereinafter.

The invention accordingly comprises the features of construction, combination of elements, and arrangement of parts, which will be exemplified in the construction hereinafter set forth, and the scope of the invention will be indicated in the claims.

For a fuller understanding of the nature and objects of the invention reference should be had to the following detailed description taken in connection with the accompanying drawing, in which:

Fig. 1 is an axial section of an embodiment of the length compensating device of the present invention as designed to serve as an intermediate unit in a valve operating linkage;

Figs. 2 and 3 are transverse sectional views respectively taken on lines 2—2 and 3—3 of Fig. 1; and Fig. 4 is an axial section of another embodiment of the invention designed to serve as a tappet.

Referring to the drawing, in which like numerals identify similar parts throughout, it will be seen from Figs. 1, 2 and 3 that one embodiment of the invention comprises a hollow body or housing 10, preferably in the form of an elongated cylindrical shell, in which is seated a sub-assembly 11, preferably enclosed therein by suitable capping means 12. The housing or shell 10 has an open top end 13 and a transversely-extending closed bottom end 14 with a stem 15 extending coaxially from the latter. Preferably the inside surface of the shell bottom 14 is concaved to concentrate contact therewith substantially to circular line contact in the vicinity of the marginal portion thereof, such as at 16.

The sub-assembly 11 is in the form of mechanical length compensating means comprising a cooperating pair of threadably interfitted or engaged members 17 and 18. The member 17 preferably is in the form of an internally-threaded female sleeve or nut, as shown, having a bottom end beveled at 19 with a sloping surface, providing a substantially line contact at 20 with a flat circular spring washer 21 which is seated on the inclined bottom of the shell 10 and has substantially a line contact therewith at 16. The member 18 preferably is in the form of an externally-threaded male member having a portion 22 threadably engaged in the internally-threaded nut 17 and an upwardly-extending, substantially cylindrical stem 23. The stem 23 is provided with a circumferentially-grooved annular flange 24 having a pair of diametrically-opposed notches 25, 25, each forming a radial abutment face 26.

The cooperating pair of threadably-engaged members 17 and 18 are tied together by torsional spring means, preferably in the form of a helical torsion spring 27 having one end 28 turned axially and seated in a hole 29 in nut flange 30 and a few turns adjacent thereto seated in a groove 31 in the bottom end of the nut for snugged clamping anchorage. As will be understood from Figs. 1 and 3, the other end 32 of the helical torsion spring 27 is turned radially inward to engage over the abutment face 26 of one of the notches 25 with a few turns thereadjacent seated in circumferential groove 33 of the annular flange 24. The major medial section of the torsion spring 27 has the turns thereof disposed about the threadably-engaged top portion of the nut 17 and portion 22 of male member 18 with suitable lateral spacing, as shown in Fig. 1, to permit contraction during tensional winding without binding on the outside of the nut. The helical torsion spring 27 urges effective screw extension of the sub-assembly comprising the nut 17 and the male member 18, as is understood in the art in connection with mechanical clearance governing or maintaining devices of this same general type.

Means are provided to serve in reverse to urge effective screw foreshortening of the threadably-engaged pair of members 17 and 18, in opposition to the torsional force applied thereto by the helical torsion spring 27. Such means preferably is in the form of an inertia hammer provided as a cylindrical sleeve 34 capable of both rotary and axial motion on the male member stem 23. The inertia hammer sleeve 34 is provided with a helical surface 35, preferably as a marginal face of a helical slot 36, engageable of a laterally-extending member, preferably a pin 37 mounted to stem 23 by being seated in a transverse hole 38 therein, as will be understood from Figure 2. The helical surface 35 provided by slot 36, against which the member-advancing abutment pin 37 rides, terminates in an abutment or stop 39, provided by the upper end of the slot, to strike the abutment pin when the inertia hammer 34 moves to its lowermost position in the manner described below.

The male member stem 23 serves as a thrust-transmitting member located at the open end 13 of the shell 10 and is so shaped as to have minimum contact with the capping means 12 serving as a thrust transfer member. Preferably, the top end 40 of the male member stem 23 is for this purpose made conical as shown in Figure 1 to have relatively small localized area of contact at 41 in a concave recess 42 in the under or inner transverse surface of the end cross wall 43 of the cap 12. The end cross wall 43 of the cap 12 is also preferably provided externally with a concave recess 44, in which a thrust-receiving linkage element, indicated in dot-dash lines at 45, may seat for transfer of thrust thereto. The thrust transfer cap 12 is preferably cup-shaped, as shown, having an elongated, substantially cylindrical skirt 46 which telescopes with the open end 13 of the shell 10, either exteriorly or interiorly thereof, preferably the latter. The extended cap skirt 46 provides appreciable lap of the open end of the shell 10 with the cup-shaped cap 12 so as to assure substantially coaxial telescopic action, thereby avoiding any problems of misalignment of linkage elements and binding which might otherwise be developed if the cap were permitted to tilt relative to the shell.

Although inward and outward motion of the cap 12 coaxial of the shell 10 is permitted, to accommodate the lengthening and foreshortening action of the housed sub-assembly 11, they are suitably retained in relative radial positions with respect to each other so as to assure rotation together. For this purpose suitable keying means are provided, preferably in the form of a C-shaped spring member 47 snapped about the upper end of the shell 10. Spring member 47 has an inturned end 48 serving as a tang extending through substantially aligned longitudinally- or axially-extending slots 49 and 50 respectively formed in the side wall of the shell 10 and the cap skirt 46, so as to require common rotation of the shell and cap with maintenance of their relative radial positions while permitting longitudinal or axial telescopic motion. For this purpose at least one of the slots 49 and 50 is made of a length substantially greater than the width of the inturned tang 48 of the spring member. Preferably, as shown in Figure 1, the slot 50 is provided with the greater length and the slot 49 has a length substantially not much greater than the width of tang 48 whereby the spring 47 remains fixed relative to the supporting shell 10 but the cap 12 is free to reciprocate with the shell.

In the use of the embodiment shown in Figs. 1, 2 and 3, the shell stem 15 may be inserted in the end of a hollow push rod seated against a solid tappet riding in contact with the cam shaft and the thrust receiving linkage element, diagrammatically illustrated at 45, which seats against the cap 12, may be the head of the rocker arm screw. When the cam lifts the device of Figures 1, 2 and 3 as an element of the linkage to an uppermost position and the cam lobe in rotation of the cam then passes away from the tappet, the latter will move down until it strikes the cam base circle. During such downward motion the inertia hammer 34 is in an uppermost position with the abutment pin 37 in the vicinity of the mouth of the helical slot 36. The stopping of the downward motion of the length compensating device will cause the inertia hammer 34 to lower and the helical surface 35 of the slot 36, riding against the abutment pin 37, will cause the inertia sleeve to spin down until its stop 39, provided by the end of the slot 36, strikes the abutment pin a blow torsionally to turn the male member 18 for threaded retraction into the nut 17 for foreshortening the sub-assembly 11 against the reverse urging of the torsion spring 27. Thereafter, the torsion spring 27 tends to retract or unthread the male member 18 up from out of the nut 17 in the opposite direction for automatic effective screw extension of the sub-assembly so that after the inertia hammer 34 has acted in the indicated manner, if there is any slack in the linkage, the torsion spring will cause effective extension or lengthening so as to remove any undesired lash.

It will be understood that the flat spring washer 21 in association with the inclined surfaces between which it is interposed provides a certain amount of lift loss to delay the opening of the engine valve. The washer 21, of course, has a strength less than that of the engine valve spring and collapses before the valve begins to open. Other types of auxiliary spring arrangements may be employed if desired, such means and their purpose being well known in the art. In general the auxiliary spring means is particularly needed when the automatic length adjusting means, such as 21, is applied in an engine originally not equipped with any form of automatic adjustment and the linkage to the engine valve has a certain amount of clearance or so-called "lash." In original installations with suitably designed cams the auxiliary spring means may not be needed.

During the described operation of the embodiment of the device shown in Figs. 1, 2 and 3, relative rotation may occur between the length compensating unit and abutting elements in the linkage. For example, the operating cam (which may be similar to that shown at 51 in Fig. 4) may cause the contacting unit or element, such as the solid tappet, to be rotated continuously or intermittently. If such relative rotation is transferred to contacting surfaces between one of the screw elements and an exterior linkage member a frictional drag or rotating force will be imposed on the screw element interfering with its automatic self-adjusting operation. In the present device, however, the shell 10 and cap 12 are keyed together and the parts of the compensating device rotate as a unit. Accordingly the screw elements are isolated from any such frictional drag which may occur for example between the linkage element 45 and the thrust transfer means or cap 12.

On the other hand the male screw part 18 is not only free of the frictional drag effects described but is free to turn readily within the shell since the stem 23 has substantially localized contact at 41. The contacting area may by original design, or through wear, be conical but in any event the mean radius or moment arm will be relatively small and the resistance to turning of the screw relative to the seat 42 accordingly small.

In the embodiment illustrated in Figure 4, the same sub-assembly 11 is mounted and housed in a shell 100 which serves as a hollow tappet body, the bottom transverse wall 114 of which rides in contact with the usual lobed cam 51. Interposed between the bottom of the assembly and the inner surface of the end wall 114 of the shell is a somewhat different arrangement of auxiliary spring means from that of Figure 1 to provide the lift loss. In this case it comprises two flat collapsible spring washers 121 with an intervening rigid conical washer 52. The cap 112, which together with the shell 100 provides an enclosing casing for the sub-assembly 11, is generally similar to the cap 12 of the embodiment of Figures 1, 2 and 3, having an elongated skirt 146 telescopically received in the open end 113 of the shell 100 and having guided contact with a pair of annular lands 53 and 54 on the inner wall of the shell, as shown. The cap 112 is retained in the shell 100 by means of a split ring 55 seated in an annular groove 56 with the split ring having diametrically opposed inwardly-extending loops 57, 57 extending to above the top end of the cap. A thrust-receiving linkage element, diagrammatically illustrated in dot-dash lines at 145 in Figure 4, may be the bottom end of a push rod having a hemispherical head seated in concave recess 44.

In the Figure 4 embodiment the device in the form of a tappet is intended to reciprocate in a cylindrical hole in the engine frame and thus the shell 100 is provided with an annular groove 58 in which the C-shaped spring member 47 is seated to avoid interference with reciprocative action. The tank 48 of the spring member 47 extends through a slot 149 in the shell wall, this slot being of a length about the width of the tank with the cap skirt 146 provided with an elongated longitudinal- or axially-extending slot 150 similar to slot 50 of the Figures 1, 2 and 3 embodiment. The elongation of the slot 150 permits the relative axial telescopic action of the cap 112 in shell 100, and it will be understood that the spring member 47 may be in the form of a spring wire with the inturned end thereof extending through a circular hole in the shell wall to ride in the longitudinal slot.

The action of and the advantages attained by the embodiment of the invention illustrated in Figure 4 are similar to those of the Figures 1, 2 and 3 embodiment.

Although the sub-assembly 11 preferably is loosely seated in the shell 10 or 100 and may have line contact with intervening support means or washers, so that at times there may be relative rotation, the desired operation will be attained when the nut is caused to rotate with the rotating shell, either by frictional drag or positive connection. One essential feature by which the important advantages of the present invention are attained is that the thrust-transmitting member, or male member 18, have interposed between it and a thrust-receiving linkage element, to which it is to apply thrust, a thrust transfer element, preferably in the form of cap 12 or 112, which is constrained to rotate with shell 10 or 100 and against which that member may have minimum or localized contact, such as either line or point, to minimize rotary drag. As a result of the provision of this feature, rotation of the housing or shell will not deleteriously affect the proper automatic extensive and foreshortening action of the housed sub-assembly. The mounting of the nut 17 in the bottom of the shell 10 or 100 not only facilitates the effective support of the sub-assembly in the housing but provides appreciable spacing between the side wall of the latter and the upper portion of the sub-assembly readily to accommodate the elongated cap skirt 46 or 146, thereby simplifying the incorporation of extensive lapping which assures coaxial telescopic action and avoids problematical misalignment of linkage elements and parts of the device in operation.

The pitch of the threads of the nut 17 and male member 18 should be chosen in accordance with the conditions in a particular case including the associated tappet structure. It is essential that the slope of the threads not be sufficiently steep to permit "crashing" of the threads. That is the intermittent heavy axial thrust imposed upon each opening of the engine valve should not cause the male member to be screwed downwardly into the nut. Any tendency of that nature is of course affected by the resistance to turning offered by the contact between the upper end of the screw part 23 and the contact member 12. In accordance with the principles of this invention such resistance is made relatively small by reason of the small area of contact which in the form of Figure 1 approximates a point contact or at least a conical area of small diameter. Under such circumstances the threads should normally be comparatively fine or of flat slope in the range of about 20 to 30 threads per inch assuming a screw diameter of about 3/8 inch. In general the larger diameter the coarser the pitch may be.

In Figure 4 a somewhat different form of contact between the screw stem 23 and its cap 112 is shown. In accordance therewith the included angle A of the cone 40a at the top of stem 23 is slightly greater or more obtuse than the included angle B comprising the conical seat 42a in the cap 112. These angles may be for example 152° and 150° respectively. As a result the contact comprises a relatively small localized area but in the form of a narrow annular band 41a. This allows comparatively free turning of the screw part 23 relative to the cap 112 under the influence of the inertia weight or the torsion spring but since the friction contact area is at a greater mean radius than in the case of the contact area of Figure 1 there is greater resistance to thread "crashing" and the threaded connection in the form of Figure 4 between the screw 18 and nut 17 may be coarser or at a somewhat steeper angle other conditions being similar.

It will thus be seen that the objects set forth above, among those made apparent from the preceding description, are efficiently attained, and since certain changes may be made in the above constructions without departing from the scope of the invention, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described my invention, what I claim as new and desire to secure by Letters Patent is:

1. A length compensating device comprising, in combination, a rotatable open-ended thrust-receiving housing, a sub-assembly seated in said housing having a pair of members cooperatively threaded together with one serving at the open end of said housing as a thrust-transmitting member, said members being tied together by torsional spring means urging effective screw extension thereof with means serving in reverse to urge effective screw foreshortening thereof, thrust transfer means at the open end of said housing mounted beyond and having rotary contact with said thrust-transmitting member, said thrust transfer means being movable toward and away from said housing in a thrust-transmitting direction, and means keying said thrust transfer means directly to said housing for rotation therewith, said keying means permitting said thrust transfer means motion toward and away from said housing while requiring rotation with the latter.

2. The length compensating device as defined in claim 1 characterized by said thrust transfer means being in the form of a cap covering said thrust-transmitting member.

3. The length compensating device as defined in claim 2 characterized by said thrust-transmitting member being a male threaded member having an end in the open end of said housing provided with limited contact of the inner side of said cap.

4. The length compensating device as defined in claim 3 characterized by the end of said male member being conical with the inner side of said cap hving a concave recess in which said conical end seats with substantially localized contact.

5. The length compensating device as defined in claim 1 characterized by said thrust transfer means having elongated guiding means telescoped with respect to said housing to guide the motion toward and away from said housing in a straight line.

6. The length compensating device as defined in claim 5 characterized by said thrust transfer means being in the form of a cap having a skirt serving as said guiding means.

7. The length compensating device as defined in claim 6 characterized by said housing being in the form of an elongated cylindrical shell closed at the end opposite its open end, said cap being in the form of a cylindrical cup telescoped into the open end of said shell, said cap and shell together serving as an enclosing casing for said sub-assembly.

8. The length compensating device as defined in claim 7 characterized by said cap cup having a concave recess in the inner face of the end thereof with said thrust-transmitting member being a male threaded member having an outer conical end seated in said concave recess with substantially localized contact.

9. The length compensating device as defined in claim 8 characterized by the side wall of said shell and the skirt of said cup being provided with aligned, axially-extending slots, said key means being a C-shaped spring member snapped about said shell and having an inturned end extending through the aligned slots, the inner one of said slots being substantially longer than the width of said inturned key end.

10. A length compensating device comprising, in combination; an elongated cylindrical shell closed at one end and open at the other; an automatic mechanical shortening and lengthening sub-assembly loosely seated in said shell and having a thrust-transmitting element located in the open shell end; a cup-shaped thrust transfer cap inverted over and covering said thrust-transmitting element and having rotary contact with the latter, said cap and said shell being telescoped together cooperatively providing an enclosing casing for said sub-assembly with said cap and shell being coaxially movable relative to each other to permit the lengthening and shortening of said sub-assembly, said cap having an external seat for abutment of a linkage element; and key means engaging said shell and cap to maintain them in the same relative radial positions, said key means permitting the relative coaxial motion of said shell and cap.

11. A length compensating device comprising, in combination; an elongated cylindrical shell closed at one end and open at the other; an automatic mechanical shortening and lengthening sub-assembly loosely seated in said shell and having a thrust-transmitting element located in the open shell end, said element terminating in a conical outer end; a cup-shaped thrust transfer cap inverted over the conical end of said thrust-transmitting element, the inside end face of said cap having a concave recess in which said conical end seats substantially with localized contact to permit ready relative rotation, said cap and said shell being telescoped together cooperatively providing an enclosing casing for said sub-assembly with said cap and shell being coaxially movable relative to each other to permit the lengthening and shortening of said sub-assembly, said cap having an external seat for abutment of a linkage element; and key means engaging said shell and cap to maintain them in the same relative radial positions, said key means permitting the relative coaxial motion of said shell and cap.

12. A length compensating device comprising, in combination; an elongated cylindrical shell closed at one end and open at the other; an automatic mechanical shortening and lengthening sub-assembly loosely seated in said shell and having a thrust-transmitting element located in the open shell end; a cup-shaped thrust transfer cap inverted over and covering said thrust-transmitting element and having localized contact with the latter to permit ready relative rotation, said cap and said shell being telescoped together cooperatively providing an enclosing casing for said sub-assembly with said cap and shell being coaxially movable relative to each other to permit the lengthening and shortening of said sub-assembly, said cap having an external seat for abutment of a linkage element; and a C-shaped spring member snapped about one of the two members comprising the cap and shell, said spring member having an inturned end extending through substantially radially-aligned slots in and extending longitudinally of said shell and cap, at least one of the aligned slots in said shell and cap being appreciably longer than the width of said inturned key member end.

13. A length compensating device comprising, in combination; an elongated cylindrical shell closed at one end and open at the other; an automatic mechanical shortening and lengthening sub-assembly loosely seated in said shell and having a thrust-transmitting element located in the open shell end, said element terminating in a conical outer end; a cup-shaped thrust transfer cap inverted over the conical end of said thrust-transmitting element, the inside end face of said cap having a concave recess in which said conical end seats substantialy with localized contact to permit ready relative rotation, said cap having a skirt telescoped into the open end of said shell cooperatively providing with the latter an enclosing casing for said sub-assembly with said cap and shell being coaxially movable relative to each other to permit the lengthening and shortening of said sub-assembly, said cap having an external end seat for abutment of a linkage element with said cap skirt and shell having in lapped portions substantially aligned longitudinally-extending elongated slots; and a C-shaped spring member snapped about said shell and having an inturned end of a width appreciably less than the lengths of the slots extending through the latter to retain relative radial positions of said cap and shell during telescopic action thereof.

14. A length compensating device comprising, in combination; an elongated cylindrical shell having a closed bottom end and an open top end; a sub-assembly loosely mounted in said housing having an internally-threaded nut seated with substantially line contact in the bottom of said shell and an externally-threaded male member threaded into said nut, said male member having an upwardly-extending elongated cylindrical stem terminating in a top conical end disposed in the open end of said shell, a helical torsion spring disposed about the threadably-engaged portions of said nut and male member with one end of the spring connected to said nut and the other end of the spring connected to said male member to urge the latter toward threadable retraction from said nut, an abutment pin extending laterally from said stem, and an inertia hammer in the form of a sleeve slidably and rotatably mounted on said stem having a helical slot in which said pin is located torsionally to drive said male member threadably to advance it into said nut in opposition to the urging of said spring; a cup-shaped cap having a closed top end and a skirt telescoped down into the open top end of said shell about said stem and inertia hammer sleeve, said cap closed end having a concave recess in the lower inside surface thereof with which said conical stem end has substantially localized contact and an external top seat for abutment of a linkage element, the overlapped portions of the cap skirt and shell having substantially aligned axially-extending slots with at least one being of appreciable length; and a C-shaped spring member snapped about said shell and having an inturned end of a width appreciably less than the length of the long slot extending through the aligned slots to retain relative radial positions of said cap and shell during telescopic action thereof.

References Cited in the file of this patent

UNITED STATES PATENTS

| | | |
|---|---|---|
| 2,419,316 | Engemann | Apr. 22, 1947 |
| 2,630,792 | Engemann | Mar. 10, 1953 |
| 2,633,112 | Engemann | Mar. 31, 1953 |
| 2,689,553 | Schmidt | Sept. 21, 1954 |